April 17, 1956
C. E. BOUCHER
2,742,259
CONDUIT TRACTOR
Filed April 6, 1953
2 Sheets-Sheet 1
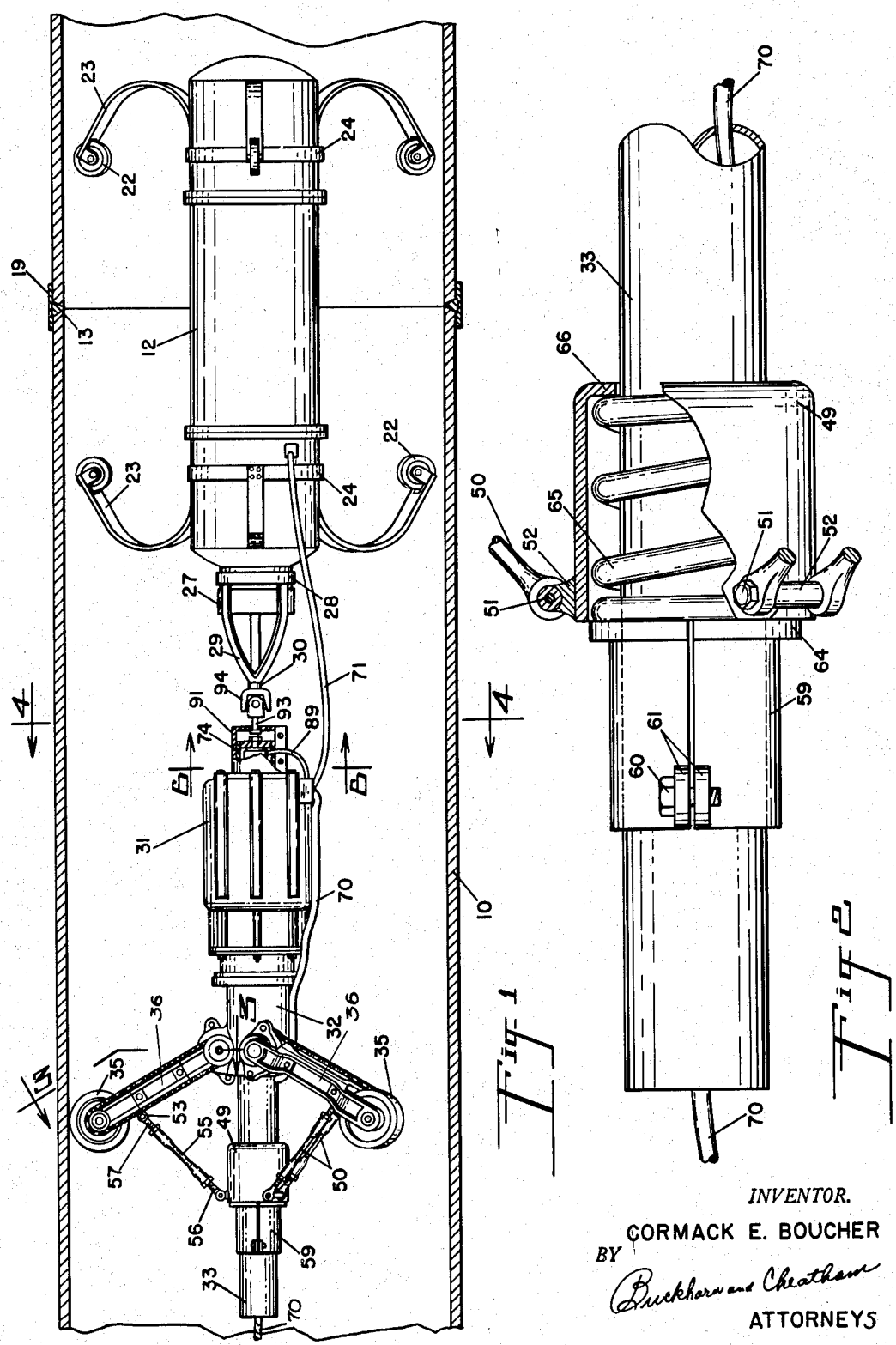
INVENTOR.
CORMACK E. BOUCHER
BY
ATTORNEYS April 17, 1956  C. E. BOUCHER  2,742,259
CONDUIT TRACTOR
Filed April 6, 1953  2 Sheets-Sheet 2
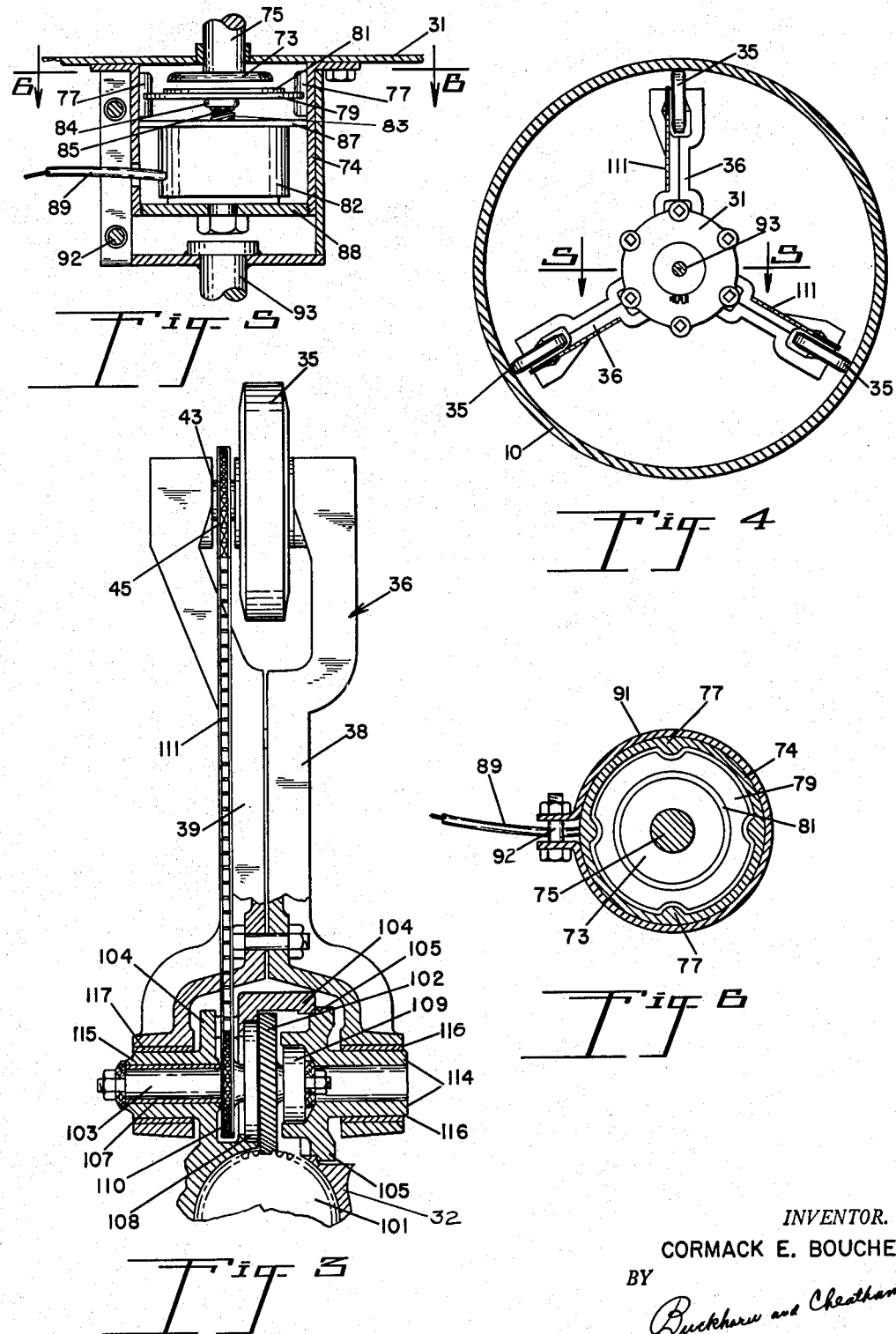
INVENTOR.
CORMACK E. BOUCHER
BY
ATTORNEYS United States Patent Office 2,742,259
Patented Apr. 17, 1956

2,742,259
CONDUIT TRACTOR
Cormack E. Boucher, Seattle, Wash.
Application April 6, 1953, Serial No. 346,889
17 Claims. (Cl. 254—134.5)

The present invention relates to a tractor for pushing or pulling apparatus through cylindrical conduits such as pipe lines and the like.

Conduit tractors heretofore employed for moving apparatus such as X-ray inspection equipment through pipe lines are comparatively heavy and cumbersome machines that are difficult for one person to manipulate for insertion into a conduit, a crane or hoist frequently being necessary to accomplish the task. Moreover, prior tractor devices are not readily adaptable for use in conduits of different diameters and some tractors have insufficient tractive force to move heavy loads.

It is an object of the present invention to provide a new and improved tractor for use in a cylindrical conduit that is relatively rugged yet relatively light in weight and easily manipulated and inserted into a conduit by a single person.

A further object of the invention is to provide a new and improved conduit tractor which is readily adjusted for use in conduits of great variance in internal diameter.

Another object of the invention is to provide a conduit tractor capable of moving relatively heavy loads through pipe lines and the like.

A more specific object of the invention is to provide a new and improved arrangement for insuring a firm gripping engagement of the traction elements of a conduit tractor with the walls of a conduit.

Another object of the invention is to provide means to assist in stopping a tractor in a predetermined position within a conduit.

Other objects and advantages of the invention will become more apparent hereinafter.

In accordance with the illustrated embodiments, the tractor of the present invention comprises an elongate frame or housing adapted to be connected at one end to apparatus to be moved through a conduit, said apparatus supporting the connected end of the tractor. A plurality of drive wheels are arranged about the opposite end of the tractor, the drive wheels being mounted on spring biased arms pivoted to the housing with means provided whereby each of the arms may be pivoted simultaneously to effect adjustment of the tractor for accommodation to conduits of different internal diameters. A motor is provided in the housing and is drivingly connected to each of the wheels for driving the tractor longitudinally of a conduit. A new and improved brake means is also provided on the tractor for stopping the motor whereby the tractor may be accurately positioned within a conduit.

For a more detailed description of the invention, reference is made to the following specification taken in conjunction with the accompanying drawings wherein:

Fig. 1 is a side elevation illustrating the conduit tractor of the invention connected to an X-ray unit;

Fig. 2 is a fragmentary view partly in section of a detail of the arm mounting arrangement;

Fig. 3 is a view of a drive wheel and supporting arm as viewed in the direction of the arrows 3—3 of Fig. 1;

Fig. 4 is an end view of the tractor as viewed in the direction of the arrows 4—4 of Fig. 1;

Fig. 5 is an enlarged, cross-sectional view along the line 5—5 of Fig. 4 illustrating the construction of the motor brake; and Fig. 6 is an enlarged cross-sectional view along line 6—6 of Fig. 1 showing further details of the brake.

Referring now to the drawings, a cylindrical conduit such as a pipe is shown at 10 and within which the tractor of the present invention is shown. The tractor of the invention is shown connected to a portable X-ray unit 12 such as is used in radiographic inspection of annular sections of the pipe such as the annular weld 13. The X-ray unit in this instance is shown as comprising a metal housing having an X-ray tube (not shown) mounted coaxially within the central section. The X-ray tube is arranged to emit radiation throughout an angle of 360 degrees about the longitudinal axis of the unit to form a shadow picture of the weld 13 on a film mounted within a suitable holder 19 and wrapped around the outside of the pipe 10 over the weld. Further details of the internal construction of the X-ray unit are not shown or described herein since such details are not essential to the present invention, and reference is made to my Patent No. 2,547,996, issued April 10, 1951, for further information regarding X-ray units for weld inspection. The X-ray unit 12 is equipped with supporting wheel assemblies at each of its opposite ends comprising a plurality of wheels 22 mounted on the ends of resilient bracket arms 23. The wheel assemblies may be removed for substitution of other assemblies adapted for supporting the unit in a conduit of different diameter. At least three wheels should be provided in circumferentially spaced apart relation about the X-ray unit in order that the housing will be accurately positioned in a predetermiend aligned relation with respect to the longitudinal axis of the pipe.

It will be understood by those skilled in the art that there will be an inherent tendency for the X-ray unit, as well as the propelling tractor, to rotate to a greater or lesser degree about the axis of the pipe and the supporting wheels should be so spaced about the housing that the unit, or at least the X-ray tube therein, will be maintained in the predetermined aligned relation, with respect to the pipe axis irrespective of rotational movement of the X-ray unit about the pipe axis. As shown in Fig. 1, the end wall of the X-ray unit adjacent the tractor is provided with an outwardly extending cylindrical flange 27 adapted for receiving a ring 28. The ring 28 is provided with a plurality of bracket arms 29 joined together at a coupling fixture 30 adapted to be cooperatively connected to the conduit tractor through a universal coupling to be hereinafter described. The coupling fixture 30 is aligned with the longitudinal axis of the X-ray unit and is adapted to support one end of the tractor in coaxial alignment with the cylindrical pipe 10.

The tractor is of elongate construction including an enclosed electric motor 31, a reduction gear unit 32 and a tubular frame extension element 33, these units being sometimes hereinafter referred to collectively as a frame, or housing of the tractor. The tractor is adapted normally to extend coaxially of a conduit. The motor 31 is coupled at one end directly to the X-ray unit 12 as will be more fully explained hereinafter, the opposite end of the motor 31 being secured by suitable means to the coaxial gear unit 32. Arranged about the gear unit 32 are a plurality of traction elements shown in the drawings as being three in number and in this instance consisting of three rubber-treaded wheels 35. It will be understood that while a greater number of wheels may be provided, a minimum of three is necessary to properly support the tractor within a conduit. The wheels 35 are spaced substantially uniformly angularly apart about a longitudinal axis corresponding substantially to the axis of the tractor and are mounted on the tractor to rotate in planes parallel with and intersecting the longitudinal axis of the tractor. The drive wheels 35 are each mounted on one end of a supporting arm 36, the opposite end of each of the arms being pivotally mounted on the gear housing portion 32 medially of the tractor with the arms extending angularly outwardly from the tractor axis towards the end of the tractor opposite the motor 31. The arms are divided longitudinally into two similar complementary parts 38, 39, shaped to provide yokes in the opposite ends thereof as best shown in Fig. 3, and bolted together as indicated in Fig. 1. The arm ends mounted on the gear housing portion 32 are suitably journaled thereon as will be described more fully hereinafter, the pivotal axis of each of the arms lying in a plane at right angles to the longitudinal axis of the tractor whereby the arms will pivot in planes parallel to and intersecting the longitudinal axis of the tractor. It will be evident that the pivotal planes of the arms are spaced uniformly angularly apart about the longitudinal axis of the tractor. The wheels 35 are rotatably supported in the yoke on the free end of the corresponding arm, the wheels being fixed to a shaft 43 journaled at its opposite end in the arm parts 38, 39. Also fixed to each of the wheel shafts 43 is wheel drive sprocket 45.

Means are provided for effecting a driving connection between the motor means 31 and the wheels 35. Mounted in the gear housing 32 and driven by the motor through any suitable speed reduction arrangement (not shown) is a spiral gear 101 which drives a complementary spiral gear 102 fixed to a shaft 103 which extends at right angles to the axis of the tractor. The ends of the shaft 103 are journaled in suitable brackets on the outer portion of the gear housing 32, the brackets comprising a portion 104 integral with the gear housing 32, and a portion 105 bolted to the portion 104. Suitable bearings 107 and 109 are provided to support the shaft 103 in the brackets 104, 105. An annular grease seal 108 is provided between the shaft 103 and the bracket portion 104. Also keyed to the shaft 103 is a sprocket 110 which is connected to drive the drive wheel sprocket 45 by suitable means such as the roller sprocket chain 111. Obviously other drive arrangements may be utilized and it will be appreciated that it is not necessary that each of the wheels 35 be driven by the motor, but it is preferred that each be driven to assure sufficient tractive force.

The bracket portions 104, 105 are formed with outwardly extending coaxial bosses 114, 115 respectively upon which are journaled the arms 36, suitable bushings 116, 117 being provided between the bosses and the arms.

Means are provided for simultaneously adjusting the angle of inclination of each of the arms so that the wheels 35 may be simultaneously moved toward or away from the tractor axis whereby the tractor may be readily adapted for use in conduits of different internal diameter. As shown in Figs. 1 and 2, a collar 49 is mounted on the tubular extension 33 spaced forwardly of the arms 36 in the direction of their inclination, which collar is slidable longitudinally of the tubular extension. Extending between the collar 49 and the free end of each of the arms 36 is a pair of struts 50. The struts 50 are pivotally secured at one end to the collar 49, the struts being mounted on a bolt 51 extending through an eyed bracket 52 formed on the collar. The struts are pivotally connected at their other end to the corresponding arm by a similar arrangement indicated in the drawings generally by numeral 53. Preferably the struts are of the type which may be adjusted as to length, having a central portion 55 in the opposite ends of which are threadably received the screw end portions 56, 57, respectively, threaded in opposite directions whereby turning of the central portion 55 will lengthen or shorten the strut correspondingly. It will be seen that, by moving the collar longitudinally of the tractor, the arms 36 will pivot correspondingly toward or away from the tractor axis.

Stop means are provided for the collar and further means are provided for resiliently biasing the arms into pressurable engagement with the inner walls of the conduit. Referring now more particularly to Fig. 2, a split sleeve 59 is mounted on the tubular extension 33 between the collar 49 and the left end of the tractor as it is shown, which sleeve is adapted to be moved longitudinally of the extension 33. Means are provided for clamping the sleeve 59 in position, which means comprises a screw 60 extending through ears 61. The end of the sleeve 59 adjacent the collar 49 is provided with an outstanding radial flange 64. Arranged about the tube 33 and abutting at one end against the flange 64 is a helical spring 65, the collar 49 enclosing the spring and having an inwardly turned flange 66 at its right end against which the opposite end of the spring 65 abuts. In placing the tractor of the invention within a conduit, the position of the sleeve 59 is first adjusted on the tube 33 with the collar 49 in contact with the spring 65 but with the spring uncompressed so that the wheels 35 define a circle of slightly greater diameter than the internal diameter of the conduit. As the tractor is pushed into the conduit, the wheels 35 will be forced inwardly toward the axis of the tractor causing the collar 49 to compress the spring 65, which compression will, of course, forcefully bias the wheels against the inner surface of the conduit. It will be seen that the tractor may be easily adjusted for use in conduits of various sizes by the simple expedient of moving the sleeve 59 longitudinally of the tractor to a suitable position. Furthermore, because of the relatively great permissible biased movement of the arms, the tractor is adapted to travel through conduits having relatively great surface irregularities such as occur in the sharp bends of expansion loops of pipe lines and which bends the tractor of the invention easily negotiates. Moreover, the simplicity of the construction of the tractor and of the component parts results in a tractor relatively light in weight so that it may be readily handled by one man for insertion in a conduit, yet the tractor is rugged and has sufficient tractive force to move relatively heavy loads through a conduit. The principal load, in the case of apparatus as shown, consists of the power supply cable 70, which may be a mile or so in length.

Power may be supplied to the tractor motor through a conductor cable 70 and through which cable the operation of the motor may also be controlled. The cable may be anchored in any suitable manner within the tube 33 of the tractor. The power for the X-ray unit may also be supplied through the cable 70, an interconnecting cable 71 being shown between the X-ray unit and the tractor.

In certain operations it is necessary that the position of the tractor or the unit which it is propelling be positioned rather exactly within the conduit. For example, in making radiographs of pipe welds, it is important that the X-ray tube be positioned in predetermined relation with respect to the pipe weld. A convenient way of accurately locating welds in a conduit is described and claimed in my Patent No. 2,532,536, issued December 5, 1950. As shown in that patent, a sensing element is provided on the X-ray unit and positioned forwardly thereof to provide a signal when a weld is located, which signal is transmitted to the operator. The tractor is preferably provided with a constant speed motor, so that the operator can stop the tractor a predetermined period of time after receipt of the signal, corresponding to the time necessary for the tractor to propel the unit to a position where the X-ray tube will be aligned with the weld. Automatic means may be provided, of course, for stopping the motor after a predetermined interval of time to accomplish the same purpose. In any case, it is necessary that the motor be stopped immediately and not permitted to rotate under its own inertia since such rotation would cause the tractor to creep ahead a sufficient distance to move it out of the proper position of alignment. A suitable brake means for immediately stopping the motor when the power thereto is cut off is provided in the present invention and will now be described with particular reference to Figs. 5 and 6. The end of the motor housing portion 31 to which the X-ray unit is connected is formed with a tubular projection 74 coaxial with the motor shaft 75, which shaft extends a short distance into the housing projection 74 and is provided with an enlarged end portion 73 having a planar end surface. Formed on the inner surface of the projecting housing portion 74 and extending longitudinally thereof are a plurality of ribs 77 adapted to guide the longitudinal movement of a friction member comprising a disc 79 of steel or other magnetically attracted material having a plurality of recesses in the periphery thereof in which are received the ribs 77. Secured to the side of the disc 79 adjacent the end of the motor shaft is a disc or sheet 81 of fibrous material having a high co-efficient of friction adapted to engage the shaft end portion 73 to stop the motor rotor. Resilient means are provided to bias the friction member against the motor shaft to stop the motor, and electromagnetic means are provided to neutralize the biasing effect of the resilient means when it is desired that the motor operate. Mounted within the housing projection 74 is the winding 82 of an electromagnet, in the axial opening of which winding is arranged a soft iron core member 83. The end of the core member 83 adjacent the steel disc 79 is provided with an outwardly extending radial flange 84, a compression spring 85 being arranged between the flange and the winding 82 to bias the core member into contact with the disc 79 and to urge the friction disc 81 against the end of the motor shaft. The magnet winding 82 is provided with an outwardly extending flange 87 on the end thereof adjacent the motor, which flange is adapted to abut against the ends of the ribs 77. Threaded in the outer end of the housing projection 74 is a cap 88 which abuts against the magnet winding 82 whereby the winding is held in place between the cap and the ribs 77. The magnet winding is connected through suitable leads indicated at 89 and in a suitable manner to the circuit of the motor so that, when the circuit to the motor is opened to stop the motor, the magnet winding 82 is deenergized whereby the spring 85 will immediately bias the friction member 79, 81 into contact with the motor shaft to brake the motor. The magnet winding is adapted, on the other hand, to be energized when power is supplied to the motor so that the core member 83 will be drawn inwardly of the winding, attracting and carrying therewith the friction member 79, 81 to relieve immediately the braking force on the motor whereby the rotor will be free to rotate. Since the brake will immediately stop the motor, the tractor and the X-ray unit will not creep after the power is shut off and the tractor and X-ray unit may be accurately positioned within a conduit.

Because of the tendency of the tractor to shift rotationally about the conduit axis, coupling should be made to the X-ray unit or other apparatus connected thereto along the line of the conduit axis so that such rotational movements will not interfere with the functioning of such other apparatus. As shown in Fig. 6, a split coupling collar 91 is secured about the housing projection 74 by means of bolts 92 or other suitable means, to which collar is welded in axial alignment with the longitudinal axis of the housing an eye member 93 comprising a portion of a universal coupling indicated at 94 through which the connection is made to the X-ray unit coupling fixture 30.

In the present instance, the tractor has been illustrated as being partially supported by the apparatus to which it is connected. Obviously the tractor may be a self-supported unit and provided with additional drive wheels in the manner shown to support the opposite end of the housing which may be desirable where large tractive force with the conduit is desired. On the other hand, a simple supporting wheel assembly such as that utilized on the X-ray unit 12 may be provided to support the motor housing portion of the tractor where the additional traction is not necessary. In any case such adaptations may be made by those skilled in the art following the present specification.

Having illustrated and described a preferred embodiment of the present invention, it should be apparent to those skilled in the art that the same permits of modification in arrangement and detail. I claim as my invention all such modifications as come within the true spirit and scope of the following claims.

I claim:

1. In a conduit tractor, a motor including a housing, an arm pivotally mounted at one end thereof on said housing for relative pivotal movement toward and away therefrom, a traction element operatively mounted on the other end of said arm adapted to engage the wall of a conduit to propel the tractor longitudinally thereof, and drive means operatively connecting said motor to said traction element and operative in any position of said arm relative to said housing to transmit power to said traction element for driving the same.

2. In a conduit tractor, a motor including a housing, an arm pivotally mounted at one end thereof on said housing for relative pivotal movement toward and away therefrom, a drive wheel adapted to engage the wall of a conduit to propel the tractor longitudinally thereof mounted on the other end of said arm, and drive means operatively connecting said motor to said drive wheel and operative in any position of said arm relative to said housing to transmit power to said drive wheel for driving the same.

3. In an elongate conduit tractor, means for supporting said tractor in a conduit with the longitudinal axis thereof coincident with the longitudinal axis of said conduit, said means including an arm pivotally mounted at one end thereof on said tractor for relative pivotal movement toward and away from said longitudinal axis thereof, a drive wheel adapted to engage the inner surface of a conduit to drive the tractor longitudinally thereof, said drive wheel being mounted on the other end of said arm, prime mover means operatively connected to said drive wheel and operative in any position of said arm relative to said longitudinal axis to transmit power to said drive wheel for driving the same, and means for adjusting the angular position of said arm relative to said tractor longitudinal axis.

4. In a conduit tractor including a housing, an arm pivotally mounted at one end thereof on said housing for relative pivotal movement toward and away from said housing, a drive wheel adapted to engage the wall of a conduit to drive the tractor longitudinally thereof, means mounting said drive wheel on the other end of said arm, a motor means operatively connected to said drive wheel to supply power thereto in any position of said arm relative to said housing for driving said drive wheel, and adjusting means connected to said housing and said arm for adjusting the position of said arm relative to said housing, said adjusting means including a resilient element for biasing said drive wheel into firm engagement with a conduit wall.

5. An elongate conduit tractor having a plurality of at least three driving wheels spaced substantially equally angularly about the longitudinal axis of said tractor for supporting said tractor in a conduit and for propelling the same therethrough, supporting means mounting said wheels on said tractor for simultaneous equal relative movement toward and away from said axis and motor means operatively connected to said driving wheels to supply power to all of said wheels in any position of said wheels relative to said axis for driving said wheels.

6. An elongate conduit tractor having at least three drive wheels spaced substantially equally angularly about the longitudinal axis of said tractor, resilient support means mounting at least one of said wheels on said tractor for movement toward and away from said tractor for biasing all of said wheels into firm engagement with the wall of a conduit, and motor means on said tractor operatively connected to supply power to all of said wheels including said one wheel in any position thereof relative to said tractor for driving said wheels.

7. In a conduit tractor, the combination of an elongated housing, at least three drive wheels mounted on said housing in substantially uniformly angularly spaced apart relation about the longitudinal axis of said housing, adjustable means supporting said wheels for relative movement toward and away from said longitudinal axis, motor means in said housing, and drive means operatively connecting said motor means to each of said wheels to supply power thereto in any position of said wheels relative to said axis for driving said wheels.

8. A conduit tractor comprising an elongate housing, at least three drive wheels spaced equally angularly about said housing at substantially equal distances from the longitudinal axis thereof, adjustable interconnected support means mounting each of said wheels on said housing for simultaneous equal movement of each of said wheels toward and away from said axis, motor means in said housing, and drive means operatively connecting said motor means to each of said drive wheels to supply power to said wheels in any position thereof relative to said axis for driving said wheels.

9. In a conduit tractor, the combination comprising an elongated housing, a plurality of at least three supporting wheels mounted on said housing for supporting the same in a conduit, supporting arms for said wheels, said supporting arms being pivotally mounted at one of their ends on said housing, said wheels being rotatably mounted on the other ends of said arms, and motor means in said housing and connected to at least one of said wheels to supply power thereto in any position of the arm upon which said one wheel is mounted for driving said one wheel.

10. A conduit tractor comprising a motor including a housing having a longitudinal axis, at least three drive wheel supporting arms pivotally mounted on said housing, the pivotal axis of said arms lying in substantially the same plane normal to the longitudinal axis of said housing, whereby said arms pivot in radial planes, said arms being spaced substantially uniformly angularly apart about said longitudinal axis and extending angularly therefrom, a drive wheel rotatably mounted on the free end of each of said arms to rotate in the radial plane of the corresponding arm, motor drive means operatively connected to each of said wheels to supply power thereto in any position of said arms relative to said housing for driving said wheels, and resilient means mounted on said housing and operatively connected to each of said arms to bias the same into engagement with the wall of a conduit.

11. A tractor for use in a cylindrical conduit, said tractor comprising an elongated frame, at least three drive wheels mounted on said frame for engaging the wall of said conduit and supporting said tractor in said conduit with the longitudinal axis of said frame substantially coinciding with the axis of said conduit, an arm for supporting each of said wheels, said arms being pivotally mounted at one end thereof on said frame for pivotal movement of the opposite end thereof relatively toward and away from said frame, said wheels being mounted on the opposite end of the corresponding arm to rotate in the direction of the longitudinal axis of said frame, prime mover means operatively connected to each of said wheels to supply power thereto in any position of said arms relative to said frame for driving said wheels, and resilient means on said frame operatively connected to said arms for resiliently biasing each of said arms into firm engagement with the wall of a conduit.

12. A tractor for use in a cylindrical conduit, said tractor comprising an elongated frame, at least three drive wheels mounted on said frame for supporting the same in a conduit coaxially therewith, a supporting arm for each of said wheels pivotally mounted at one end thereof on said frame and extending angularly outwardly from said frame, the pivotal axis of each of said arms lying in substantially the same plane normal to the longitudinal frame axis whereby said arms pivot in planes parallel to and intersecting said frame axis, said arms being spaced substantially equally angularly circumferentially of said frame, said wheels being mounted on the opposite end of the corresponding arm to rotate in the plane of movement thereof, said tractor including motor means operatively connected to each of said wheels to supply power thereto in any position of said arms relative to said frame for driving said wheels, and means on said frame operatively connected to said arms for effecting equal pivotal movement of each of said arms about its pivotal axis in response to pivotal movement of one of said arms.

13. A tractor for use in a cylindrical conduit, said tractor comprising an elongated frame, at least three drive wheels mounted on said frame for supporting the same in a conduit with the longitudinal axis of the frame coincident to the axis of the conduit, an arm for supporting each of said wheels, said arms being pivotally mounted at one end thereof on said frame and extending angularly outwardly from said frame, the pivotal axis of each of said arms lying in substantially the same plane normal to said frame axis whereby said arms move in planes parallel to and intersecting said frame axis, said wheels being mounted on the opposite end of the corresponding arm to rotate in the plane of movement thereof and adapted to engage the wall of a conduit, motor means operatively connected to each of said wheels to supply power thereto in any position of said arms relative to said frame for driving said wheels, and adjustable means on said frame operatively connected to said arms for biasing each of said arms outwardly of said frame and for effecting equal pivotal movement of each of said arms about its pivotal axis in response to pivotal movement of one of said arms.

14. A conduit tractor comprising an elongated tubular frame, at least three substantially identical wheel supporting arms pivotally mounted medially of said frame and extending angularly therefrom toward one end of said frame, the pivotal axis of each of said arms lying in substantially the same plane normal to the longitudinal axis of said frame, the pivotal planes of said arms being spaced substantially uniformly angularly apart, a tractor drive wheel mounted on the free end of each of said arms to rotate in the plane of the corresponding arm, a collar slidably mounted on said frame adjacent said one end, a strut connecting the free end of each of said arms with said collar whereby movement of said collar longitudinally of said frame will effect equal pivotal movement of said arms, and resilient means mounted on said frame to resist movement of said collar toward said one end.

15. A conduit tractor comprising an elongated generally tubular frame, at least three wheel supporting arms of substantially equal length pivotally mounted medially of said frame and extending angularly therefrom toward one end of said frame, the pivotal axes of said arms lying in a plane normal to the longitudinal axis of said frame, the pivotal planes of said arms being spaced substantially uniformly angularly apart about said axis, a tractor drive wheel mounted on the free end of each of said arms to rotate in the plane of the corresponding arm, a collar slidably mounted on said frame, a strut connecting the free end of each of said arms with said collar whereby movement of said collar longitudinally of said frame will effect equal pivotal movement of said arms, adjustable stop means on said frame adjacent said one end to arrest movement of said collar toward said one end, and spring means operatively arranged between said stop means and said collar whereby said wheels may be adjusted into pressurable engagement with a conduit wall.

16. A conduit tractor including an elongated frame, a plurality of at least three drive wheels mounted on said frame for supporting said tractor for movement logitudinally of a cylindrical conduit with the longitudinal axis of said frame coinciding with the axis of said conduit, a plurality of drive wheel supporting arms, means pivotally mounting one end of said arms on said frame with said arms spaced substantially uniformly apart about the longitudinal axis of said frame and with each of said arms pivoting in a plane parallel to and intersecting said longitudinal axis, said wheels being rotatably mounted one on each of the opposite ends of said arms to rotate about an axis normal to the plane of movement of the corresponding arm, a collar mounted on said frame for movement longitudinally thereof, a strut extending between the said opposite end of each of said arms and said collar, said struts being pivotally secured at one end thereof to the corresponding arm and at the other end thereof to said collar whereby movement of said collar longitudinally of said frame will correspondingly pivot said arms toward or away from said frame, and means for adjusting the longitudinal position of said collar on said frame.

17. A motive tractor for a unit disposed within a cylindrical conduit having tractor coupling means coincident with the axis of said conduit and adapted to be connected to said tractor and to support one end of the same, said tractor including an elongated, generally tubular motor and gear housing, means on one end of said housing coaxial therewith for coupling the same to said unit, at least three drive wheels mounted on said housing for supporting said housing coaxially in said conduit and for driving said tractor longitudinally of the conduit, a drive wheel supporting arm for each of said drive wheels pivotally mounted on said housing medially thereof and extending angularly outwardly therefrom toward the end thereof opposite said coupling means, said arms being of substantially equal length and spaced substantially equally angularly apart, the pivotal axis of each of said arms lying in a plane at right angles to the longitudinal axis of said housing, said drive wheels being mounted on the free end of the corresponding arm for rotation in a plane parallel to and intersecting the axis of said conduit, a collar mounted on said housing adjacent said opposite end and movable longitudinally of said housing, strut means connected between each of said arms and said collar for holding each said arm outwardly of said housing, stop means on said housing for limiting movement of said collar toward said opposite end, spring means operatively connected between said collar and said stop whereby said arms may be pivoted inwardly of said housing against the bias of said spring means, and motor means in said housing drivingly connected to each of said drive wheels.

References Cited in the file of this patent

UNITED STATES PATENTS

| | | |
|---|---|---|
| 443,824 | Cope | Dec. 30, 1890 |
| 621,018 | Benjamin | Mar. 14, 1899 |
| 632,353 | Kohler | Sept. 5, 1899 |
| 774,525 | Mack | Nov. 8, 1904 |
| 1,810,143 | Okey | June 16, 1931 |
| 2,455,273 | Schott et al. | Nov. 30, 1948 |
| 2,514,694 | Chapman | July 11, 1950 |
| 2,604,521 | Boucher | July 22, 1952 |